(12) United States Patent
Sudre et al.

(10) Patent No.: US 7,270,520 B2
(45) Date of Patent: Sep. 18, 2007

(54) FAIRING FOR THE ROTOR OF A ROTORSCRAFT

(75) Inventors: Laurent Sudre, Grans (FR); Sebastien Voisin, Marseille (FR)

(73) Assignee: Eurocopter, Marignane Cedex (FR)

( * ) Notice: Subject to any disclaimer, the term of this patent is extended or adjusted under 35 U.S.C. 154(b) by 116 days.

(21) Appl. No.: 11/008,170

(22) Filed: Dec. 10, 2004

(65) Prior Publication Data
US 2005/0226723 A1   Oct. 13, 2005

(30) Foreign Application Priority Data
Dec. 10, 2003   (FR) .................................. 03 14492

(51) Int. Cl.
*B64C 11/14* (2006.01)

(52) U.S. Cl. ............... 416/245 R; 244/130; 416/244 R

(58) Field of Classification Search .................. 416/94, 416/244 R, 245 R; 244/17.11, 130
See application file for complete search history.

(56) References Cited

U.S. PATENT DOCUMENTS

| | | | | |
|---|---|---|---|---|
| 1,864,260 A | * | 6/1932 | Squires | .................... 416/244 R |
| 3,181,815 A | | 5/1965 | Paul | |
| 5,820,073 A | * | 10/1998 | Aldin, Sr. | ................. 244/17.11 |
| 6,336,791 B1 | * | 1/2002 | O'Toole | .................. 416/245 R |

* cited by examiner

*Primary Examiner*—Edward K. Look
*Assistant Examiner*—Dwayne J White
(74) *Attorney, Agent, or Firm*—Young & Thompson

(57) ABSTRACT

A fairing C is arranged on a rotor 9 of a rotorcraft having a cap 5 secured to the end 10 of the head of the rotor 9. The fairing C further comprises at least one air deflector member D provided with a ring 6 and spacers 4, the spacers 4 enabling the ring 6 to be secured to the cap 5.

29 Claims, 2 Drawing Sheets

FAIRING FOR THE ROTOR OF A ROTORSCRAFT

The present invention relates to a fairing serving to reduce the vibration generated on the structure of a rotorcraft flying in translation by the aerodynamic flow of air downstream from the main rotor and the covers disposed on top of the fuselage of the rotorcraft.

BACKGROUND OF THE INVENTION

This aerodynamic flow is commonly referred to as the "slipstream".

While a rotorcraft is flying in translation, the slipstream strikes the tail fin and/or stabilizers that occupy respective positions that are substantially vertical and horizontal relative to the rotorcraft, and that are generally secured to the rear end of the fuselage known as the tail boom in the art.

This impact leads to vibration, commonly known as "tail shake" in aviation technology. The vibration is then transmitted to the rotorcraft as a whole and presents numerous drawbacks, and in particular:

for the comfort of the crew and passengers;
for the fatigue of parts and equipment; and
for the operation of weapons systems of the rotorcraft, if it has any.

U.S. Pat. No. 3,181,815 discloses a cap disposed on the rotor head. While flying in translation, the cap creates aerodynamic lift and, as a result, deflects the slipstream downwards, mainly against the tail boom and no longer against the tail stabilizer and fin of the rotorcraft. The tail shake effect is greatly diminished.

Nevertheless, starting from a relatively steep angle of attack of the rotorcraft known as the critical angle of attack, the boundary layer separates from said cap. It is also known that when the boundary layer separates from a moving body, there is a sudden loss of lift on the body. Under such conditions, the lift of the cap decreases, the beneficial effect of the cap is attenuated, and possibly even eliminated.

OBJECTS AND SUMMARY OF THE INVENTION

Consequently, an object of the present invention is to remedy that drawback by deflecting the slipstream of a rotorcraft towards its tail boom, regardless of the angle of attack of the rotorcraft.

According to the invention, a fairing arranged on the rotor of the rotorcraft, including a cap maintained on the end of the rotor head, includes at least one air deflector member secured to said cap.

Preferably, the width of deflector member lies in the range 10% to 20% of the diameter of the cap;

Advantageously, the air deflector member is in the form of a ring having the same axis of rotation as the cap and the rotor.

In addition, the ring possesses one or more of the following characteristics:

it is connected to the cap via at least three spacers;
it has a thin profile, said thin profile being flat or curved;
it has a thick profile, which profile may be symmetrical or otherwise;
the thick profile has a leading edge and a trailing edge that are rounded;
the thick profile has a leading edge that is angular and a trailing edge that is rounded;
the thick profile has a leading edge that is rounded and a trailing edge that is angular;
the leading edge of the ring is spaced apart from the cap by a first distance, the trailing edge of the ring is spaced apart from the cap by a second distance, and said first distance is equal to the second distance;
the first distance is greater than the second distance;
the first distance is less than the second distance.

In addition, the spacers are advantageously of a height lying in the range 3% to 10% of the diameter of the cap.

BRIEF DESCRIPTION OF THE DRAWINGS

The present invention and its advantages appear below in greater detail from the following description relating to illustrative embodiments and made with reference to the accompanying figures, in which.

Each of FIGS. 4-8 is a cross-section through a rotor fairing in an alternative embodiment.

MORE DETAILED DESCRIPTION

Elements present in more than one figure are given the same references in all of them.

Figure 1:
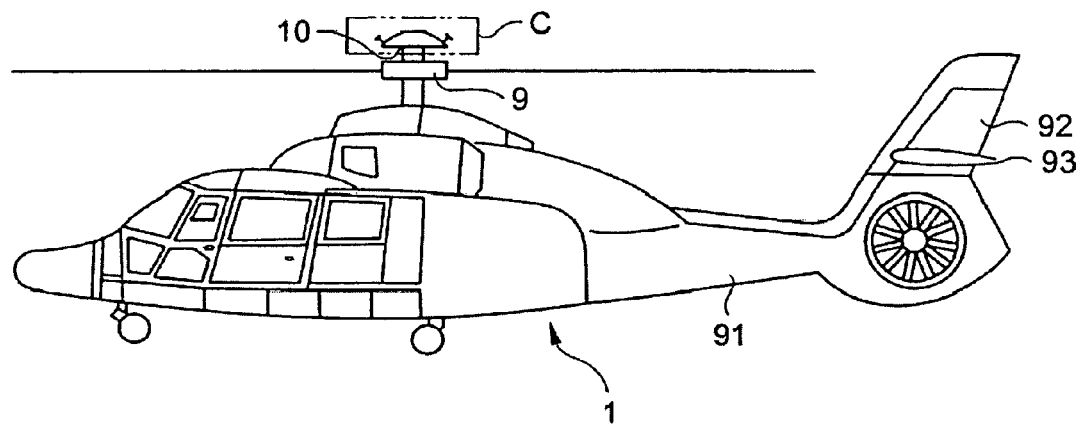
FIG. 1 is a diagrammatic view of a rotorcraft fitted with a fairing of the invention.

FIG. 1 is a diagrammatic view of a rotorcraft 1, having a rotor 9, a tail boom 91, a tail fin 92, and a tail stabilizer 93. This figure also shows a cross-section through a fairing C of the invention arranged at the end 10 of the head of the rotor 9.

Figure 2:
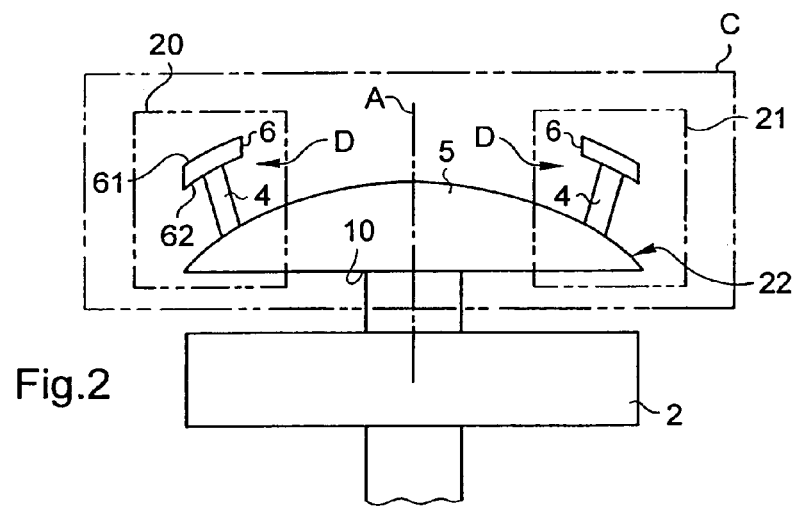
FIG. 2 is a cross-section through a rotor fairing in a first embodiment.

FIG. 2 is a cross-section through a fairing C for the rotor of a rotorcraft in a first embodiment of the invention.

This fairing C is advantageously constituted by an air deflector member D and a cap 5 of conventional type. The air deflector member D is provided with three spacers 4 and a ring 6 having the same axis of rotation A as the rotor 9 and the cap 5, the spacers 4 enabling the ring 6 to be secured to the cap 5.

The ring 6 is in the form of a thin profile in diametral section, i.e. a profile where the top and bottom faces 61 and 62 are parallel. This thin profile may be flat, but it is preferably curved, i.e. of the curved profile type.

When flying in translation, the ring 6 has two important aerodynamic effects.

Firstly, at the upstream profile 20, the ring 6 creates aerodynamic lift which is added to the lift of the cap 5. This improvement is particularly significant since the ability of the fairing C to deflect the slipstream towards the tail boom is directly proportional to the lift of the fairing C.

In addition, at the downstream profile 21, the ring serves to reinject a fraction of the air flow into the separation zone 22 of the cap 5. In the event of the rotorcraft being at a large angle of attack, this reinjected air flow will prevent the boundary layer from separating from the cap 5. Consequently, the extra lift created in this way maintains the lift provided by the fairing C at a level that is acceptable regardless of the angle of attack of the rotorcraft.

Figure 3:
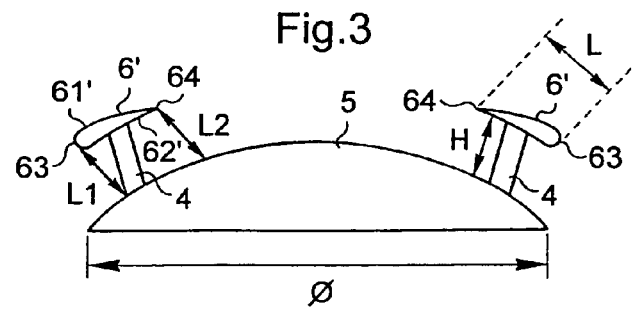
FIG. 3 is a cross-section through a rotor fairing in a second embodiment.
Figure 4:
Figure 5:
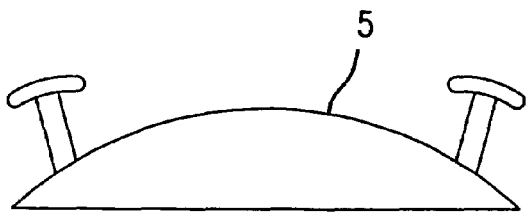
Figure 6:
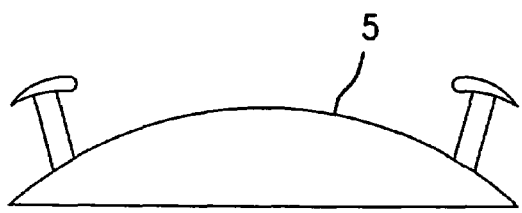
Figure 7:
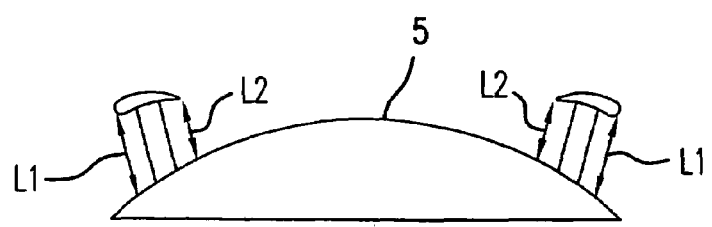
Figure 8:
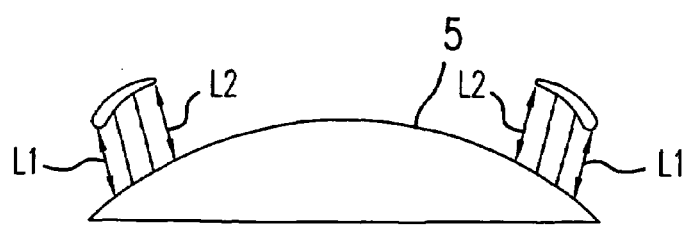

FIG. 3 shows a second embodiment, the ring 6' in this embodiment having a thick profile, i.e. a profile in which the top and bottom surfaces 61' and 62' are constituted by two non-parallel curved lines. This thick profile significantly improves the aerodynamic performance of the ring 6'. More precisely, the thick profile has a substantially rounded leading edge and a trailing edge that is angular. Such a profile is generally obtained by combining a thickness relationship and a camber relationship, where the camber relationship determines the lift of the profile at a zero angle of attack. Such a profile is thus generally dissymmetric. When the camber is zero, the profile is symmetrical, and lift is zero at zero angle of attack.

Nevertheless, the thick profile may also have a thick trailing edge, as is the case for example for a profile that is elliptical.

In contrast, in another embodiment of the invention, the thick profile has a leading edge that is angular and a trailing edge that is rounded.

Furthermore, experience shows that the operation of the fairing C is optimized when it possesses the following geometrical characteristics:

the width L of the ring 6' has a value lying in the range 10% to 20% of the diameter Ø of the cap 5;

the height H of the spacer 4 has a value lying in the range 3% to 10% of the value of the diameter Ø of the cap 5; and the leading edge 63 of the ring 6' is spaced apart from the cap 5 by a first distance L1, the trailing edge 64 of the ring 6' is spaced apart from the cap 6 by a second distance L2, and the distance L1 is equal to the distance L2.

In a first variant of these embodiments, a plurality of rings 6 are arranged on the cap 5.

In a second variant of these embodiments, the distance L1 is greater than the distance L2.

In a third variant of these embodiments, the distance L1 is less that the distance L2.

Naturally, implementation of the present invention can be varied in numerous ways. Although several embodiments are described above, it will readily be understood that it is not conceivable to identify all possible embodiments in exhaustive manner. Naturally, any means described could be replaced by equivalent means without going beyond the ambit of the present invention.

What is claimed is:

1. A fairing arranged on a rotor of a rotorcraft, said fairing comprising a cap held to the end of the head of the rotor, and also comprising at least one air deflector member secured to said cap, wherein said air deflector member is a ring having the same axis of rotation as the rotor and the cap, wherein said ring is secured to the cap via at least three spacers, and wherein the height of each said spacer has a value lying in the range 3% to 10% of the diameter Ø of the cap.

2. A fairing according to claim 1, wherein the width of said air deflector member has a value lying in the range 10% to 20% of the diameter Ø of the cap.

3. A fairing according to claim 1, wherein said ring has a thin profile.

4. A fairing according to claim 3, wherein said thin profile is flat.

5. A fairing according to claim 3, wherein said thin profile is curved.

6. A fairing according to claim 1, wherein said ring has a thick profile.

7. A fairing according to claim 6, wherein said thick profile is symmetrical.

8. A fairing according to claim 6, wherein said thick profile is dissymmetric.

9. A fairing according to claim 6, wherein said thick profile has a rounded leading edge and an angular trailing edge.

10. A fairing according to claim 6, wherein said thick profile has a leading edge and a trailing edge that are rounded.

11. A fairing according to claim 6, wherein said thick profile has a leading edge that is angular and a trailing edge that is rounded.

12. A fairing according to claim 1, wherein the leading edge of said ring is spaced apart from the cap by a first distance, the trailing edge of said ring is spaced apart from the cap by a second distance, and said first distance is equal to said second distance.

13. A fairing according to claim 1, wherein the leading edge of said ring is spaced apart from the cap by a first distance, the trailing edge of said ring is spaced apart from the cap by a second distance, and said first distance is greater than said second distance.

14. A fairing according to claim 1, wherein the leading edge of said ring is spaced apart from the cap by a first distance, the trailing edge of said ring is spaced apart from the cap by a second distance, and said first distance is less than said second distance.

15. A fairing arranged on a rotor of a rotorcraft, said fairing comprising a cap held to the end of the head of the rotor, and also comprising at least one air deflector member secured to said cap, wherein the width of said air deflector member has a value lying in the range 10% to 20% of the diameter Ø of the cap.

16. A fairing according to claim 15, wherein said air deflector member is a ring having the same axis of rotation as the rotor and the cap.

17. A fairing according to claim 16, wherein said ring is secured to the cap via at least three spacers.

18. A fairing according to claim 16, wherein said ring has a thin profile.

19. A fairing according to claim 18, wherein said thin profile is flat.

20. A fairing according to claim 18, wherein said thin profile is curved.

21. A fairing according to claim 16, wherein said ring has a thick profile.

22. A fairing according to claim 21, wherein said thick profile is symmetrical.

23. A fairing according to claim 21, wherein said thick profile is dissymmetric.

24. A fairing according to claim 21, wherein said thick profile has a rounded leading edge and an angular trailing edge.

25. A fairing according to claim 21, wherein said thick profile has a leading edge and a trailing edge that are rounded.

26. A fairing according to claim 21, wherein said thick profile has a leading edge that is angular and a trailing edge that is rounded.

27. A fairing according to claim 16, wherein the leading edge of said ring is spaced apart from the cap by a first distance, the trailing edge of said ring is spaced apart from the cap by a second distance, and said first distance is equal to said second distance.

28. A fairing according to claim 16, wherein the leading edge of said ring is spaced apart from the cap by a first distance, the trailing edge of said ring is spaced apart from the cap by a second distance, and said first distance is greater than said second distance.

29. A fairing according to claim 16, wherein the leading edge of said ring is spaced apart from the cap by a first distance, the trailing edge of said ring is spaced apart from the cap by a second distance, and said first distance is less than said second distance.

* * * * *